(12) United States Patent
Xu et al.

(10) Patent No.: US 10,627,317 B2
(45) Date of Patent: Apr. 21, 2020

(54) SELF-ANCHORED PILING SEDIMENT SAMPLER

(71) Applicant: DALIAN UNIVERSITY OF TECHNOLOGY, Dalian, Liaoning (CN)

(72) Inventors: Shiguo Xu, Liaoning (CN); Tianxiang Wang, Liaoning (CN); Zaigang Xie, Liaoning (CN); Weiguo Gao, Liaoning (CN); Mengke Zhao, Liaoning (CN); Feifei Wen, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 218 days.

(21) Appl. No.: 15/564,854

(22) PCT Filed: Aug. 31, 2015

(86) PCT No.: PCT/CN2015/088623
§ 371 (c)(1),
(2) Date: Oct. 6, 2017

(87) PCT Pub. No.: WO2017/035743
PCT Pub. Date: Mar. 9, 2017

(65) Prior Publication Data
US 2018/0106703 A1  Apr. 19, 2018

(51) Int. Cl.
*G01N 1/08* (2006.01)
(52) U.S. Cl.
CPC ..................................... *G01N 1/08* (2013.01)

(58) Field of Classification Search
CPC .................................. G01N 1/08; E21B 25/18
(Continued)

(56) References Cited

U.S. PATENT DOCUMENTS 3,345,879 A * 10/1967 Nasu ...................... E21B 7/1245
173/159
3,372,760 A * 3/1968 Raymond ............... E21B 7/124
175/5

(Continued)

FOREIGN PATENT DOCUMENTS

CN  102749219 A  10/2012
CN  203908806 U  10/2014
(Continued)

*Primary Examiner* — Daniel S Larkin
(74) *Attorney, Agent, or Firm* — Muncy, Geissler, Olds & Lowe, PC (57) ABSTRACT

A self-anchored piling sediment sampler is mainly composed of a sampling tube mechanism, an anchor rack mechanism and a cable. A drainer is designed for automatic drainage and air seal, so that an anchor socket can form a good anchoring condition with sediments during collection, thereby providing a stable sampling condition in cooperation with adjustable self gravity. The drainer is also applied in the sampling tube mechanism, thereby facilitating collection and seal of sediment samples. At the end of sampling, a water injector can eliminate suction force of the sediments and alleviate resistance in a lifting process. The cable is fixed to an outer sampling tube by first fixed pulleys, clamping hooks and second fixed pulleys placed on fixing rods so as to realize the conversion of the pulling force into the pressure on the sampling tube and provide a driving force for sampling.

3 Claims, 7 Drawing Sheets

(58) Field of Classification Search
USPC .................................................. 73/864.44
See application file for complete search history.

(56) References Cited

U.S. PATENT DOCUMENTS

| | | | | |
|---|---|---|---|---|
| 4,345,461 A | * | 8/1982 | Lezgintsev | ............. E21B 25/18 |
| | | | | 73/170.32 |
| 4,996,887 A | * | 3/1991 | Voll | ........................ E21B 7/124 |
| | | | | 175/59 |
| 5,062,309 A | * | 11/1991 | Voll | ........................ G01N 1/08 |
| | | | | 73/864.44 |
| 5,419,211 A | * | 5/1995 | Rodel | ..................... E21B 10/02 |
| | | | | 73/864.44 |
| 5,559,295 A | | 9/1996 | Sheryll | |
| 5,831,185 A | * | 11/1998 | Maxwell | ................. E21B 7/124 |
| | | | | 73/864.45 |
| 6,354,767 B1 | * | 3/2002 | Jones | ..................... E02D 13/04 |
| | | | | 405/232 |
| 6,463,801 B1 | * | 10/2002 | Young | ........................ E02D 1/04 |
| | | | | 73/170.32 |
| 7,392,856 B2 | * | 7/2008 | Nance | ..................... G01N 1/08 |
| | | | | 175/20 |
| 8,191,436 B2 | * | 6/2012 | Chun | ..................... E21B 25/18 |
| | | | | 73/864.44 |
| 8,511,184 B2 | * | 8/2013 | Voll | ........................ G01N 1/16 |
| | | | | 73/863.81 |
| 2011/0179888 A1 | | 7/2011 | Danesh | |

FOREIGN PATENT DOCUMENTS

| | | |
|---|---|---|
| CN | 204439409 U | 7/2015 |
| SU | 1153256 A1 | 4/1985 |

\* cited by examiner

SELF-ANCHORED PILING SEDIMENT SAMPLER

TECHNICAL FIELD

The present invention belongs to the technical fields of environmental monitoring, environmental government and sediment sample collection, relates to the collection of sediment of reservoirs and other water bodies with great water depth and soft bottom material, and especially relates to the collection of columnar layered sediment samples of the reservoirs.

BACKGROUND

Sediments pollution has been studied intensively in recent years. Pollutants generate an unignorable influence on hydro-environment in the transfer and transformation process and the absorption and release process. The foundation for research of such problem is to obtain representative samples.

The surface sediments which are mainly composed of water-saturated silts have poor bearing capacity and cannot support a sampling device, especially a large sampling device. However, under the effect of gravity, lower sediments are increasingly dense, making it more difficult to collect the bottom sediments. Current sediment samplers fall into two categories, surface sediment sampler and layered sediment sampler. Common surface sediment samplers use a grapple dredge and box dredge, and a shovel can also be used for direct acquisition for shallows, estuaries and other places. These samplers can satisfy the collection of surface sediment samples in most cases. The layered sediment sampler mainly includes all kinds of columnar sediment samplers and can be divided into two kinds: a gravity type sampler and a vibrational type sampler. The gravity type sediment sampler rushes into the sediments on the water bottom depending on its self-weight, so as to realize layered collection of sediment samples. Such sampler has the problems of easy inclination in the sampling process, heavy self-weight, sampling depth limited by self-weight, and the like, and has a higher requirement for sampling environment. The vibrational sediment sampler "liquefies" the sediments depending on frequency vibration to realize layered sampling, but the device is larger and is mainly applied in geological sampling currently while less applied in a water area environment.

Apparently, the above devices cannot completely solve the problems of complicated devices, heavy weight and low sampling efficiency in the collection of the columnar layered sediments. There is a need to develop a layered sediment sampler with light weight, high efficiency and good applicability.

SUMMARY

The technical problems to be solved in the present invention are complicated device, heavy weight and low sampling efficiency of the existing device, thereby providing a self-anchored piling sediment sampler which can collect the original state of sample, and with light weight, high efficiency and manual operation, so as to be suitable for collection of sediments of reservoirs and the like with great water depth and soft bottom material, and especially collection of columnar layered sediment samples of the reservoirs.

The technical solution of the present invention is as follows:

The self-anchored piling sediment sampler mainly comprises an anchor rack mechanism, a sampling duct, a sampling tube mechanism, a cable and a counterweight. The sampling tube mechanism is composed of an upper outer sampling tube, a drain tube, a self-balancing sealing block and an inner sample tube. The outer sampling tube is provided with an external thread on the top, a daisy sealer on the bottom, and three uniform holes in an upper part for connection to the iron chains. A removable grid is distributed on the top of the drain tube to prevent the self-balancing sealing block from overflowing and a large object from entering the sampler; three uniformly distributed drain ports are formed in the middle of the drain tube; the inner part of the drain tube is designed into an ellipsoid to be fitted with the self-balancing sealing block to form a seal; and the lower part of the drain tube is provided with an internal thread to be connected with an external thread of the outer sampling tube. The self-balancing sealing block is made of light material with a smaller density than water; the weight of a lower screw is regulated so that the density of the self-balancing sealing block is between $1.1 \times 10^3$ kg/m$^3$ and $1.5 \times 10^3$ kg/m$^3$ and the self-balancing sealing block is easy to float under the dynamic effect of the water; the center of gravity of the self-balancing sealing block is at the bottom of a centerline to achieve automatic balance regulation guarantee and drain tube fit, so as to form an airtight effect. The drain tube and the self-balancing sealing block together form the drainer as an integral structure. The inner sample tube is an acrylic organic glass tube The anchor rack mechanism is composed of a top fixing plate, a bottom anchor socket, three uniformly distributed lower fixed pulleys on the anchor socket, a water injector, a drainer, a fixing bracket, upper fixed pulleys, three uniformly distributed clamping hooks and three uniformly distributed fixing rods. A preformed hole of the sampling duct and three uniformly distributed lacing holes are formed in the fixing plate; and the positions of the lacing holes correspond to the lower fixed pulleys, the upper fixed pulleys and the clamping hooks, so that the cable can be effectively connected with the whole instrument. Three uniformly distributed lower fixed pulleys, the water injector and the drainer are arranged on the anchor socket, and the preformed hole for the sampling duct is also formed in the anchor socket; and a tubular supporting plate is arranged on the bottom. the water injector is composed of a shell of the water injector, a bolt on the top of the shell, a spring under the bolt and a sealing block connected with the spring, three water injection holes are formed in the lower part of the shell, embedded into the annular supporting plate of the anchor socket; the bolt is configured for regulating the pulling force of the spring; during sampling, the sealing block and a tube wall form a seal due to the pulling force of the spring; when sampling is ended, the sealing block subjected to suction force of a sediment falls onto the lower part of the anchor socket; water is injected into the bottom of the anchor socket through the water injection holes, so as to release the suction force of the anchor socket and take out the collector portably. The drainer is the same as that of the sampling tube mechanism. See the description of the sampling tube mechanism for details. The fixing bracket is provided with three seams to facilitate the fixing rods to pass through, and the upper fixed pulleys and the clamping hooks are installed on the fixing rods. The fixing bracket is used for stabilizing an integral structure. Members are connected through welding, threads and angle steel to form the entire anchor rack mechanism.

The sampling duct successively penetrates through the preformed hole of the fixing plate and the preformed holes of the fixing bracket and the anchor socket so as to be connected with the anchor rack mechanism. The sampling duct is provided with three uniformly distributed guide rails; and during installation, attention is paid to that the guide rails adapt to the preformed holes of the lower fixed pulleys, the upper fixed pulleys and the fixing support. Rubber rings are arranged inside and outside the bottom of the sampling duct; the outer rubber ring is used for forming a seal with the anchor socket, and the inner rubber ring is used for ensuring the formation of friction with the sampling tube mechanism so as to ensure that the sampling tube mechanism does not fall when a sampler is lowered.

The cable is used for connecting the whole device and is divided into three parts; the first part is three iron chains which penetrate through the lower fixed pulleys to the small holes of the outer sampling tube from the clamping hooks; the second part is three short cables. The short cables are connected with the iron chains on the clamping hooks and penetrate through the upper fixed pulleys so that the cables are connected with the first-section iron chains; the third part is a long cable for connecting the three short cables of the second part into an integral stress cable through a cable fastener, which is used to bear the weight of sampler. The counterweight is connected with the anchor socket.

By combining the anchoring force of the anchor socket with self gravity (regulated by the counterweight), the self-anchored piling sediment sampler provides a stable sampling environment while reducing the weight, and converts the pulling force into pressure on the outer sampling tube through two fixed pulleys to form a sampling mode similar to piling.

Effects and benefits of the present invention are compared with the defects of low efficiency, complicated operation and heavy weight of the existing sediment sampler, inventing a device with mutual operability, truth-protection, light weight, high efficiency and suitability for collection of layered sediments of such water bodies as reservoirs, lakes, rivers and the like.

In the figures: 1 anchor rack mechanism; 2 sampling duct; 3 sampling tube mechanism; 4 cable; 5 counterweight;

1-1 fixing plate; 1-2 anchor socket; 1-3 lower fixed pulley; 1-4 water injector; 1-5 drainer; 1-6 fixing bracket; 1-7 upper fixed pulley; 1-8 clamping hook; 1-9 fixing rod; 3-1 outer sampling tube; 3-2 drain tube; 3-3 self-balancing sealing block; 3-4 inner sample tube; 3-5 lower screw; 4-1 iron chain; 4-2 short cables; 4-3 long cable.

Figure 7A:
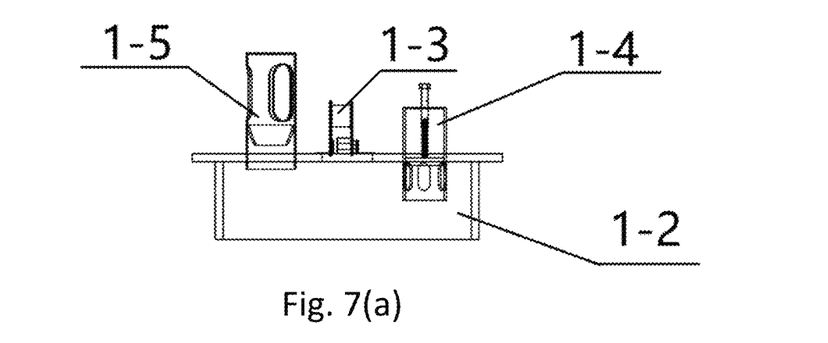
FIG. 7(a) is a side schematic diagram of an anchor rack device.
Figure 7B:
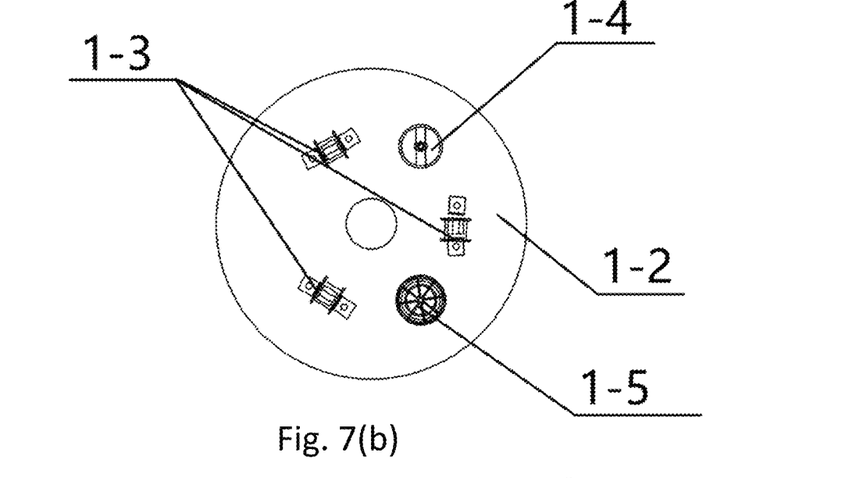
FIG. 7(b) is an overhead schematic diagram of an anchor rack device.
Figure 7C:
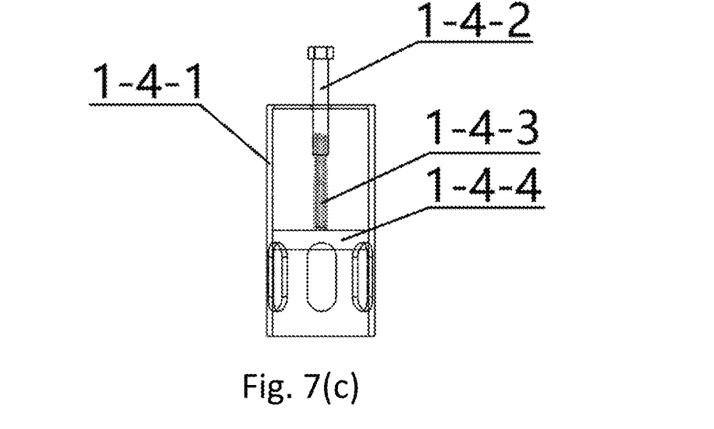
FIG. 7(c) is a schematic diagram of a water injector.

1-4-1 shell of water injector; 1-4-2 bolt; 1-4-3 spring; 1-4-4 sealing block.

DETAILED DESCRIPTION

Specific embodiments of the present invention are described below in detail in combination with the technical solution and accompanying drawings.

Figure 1:
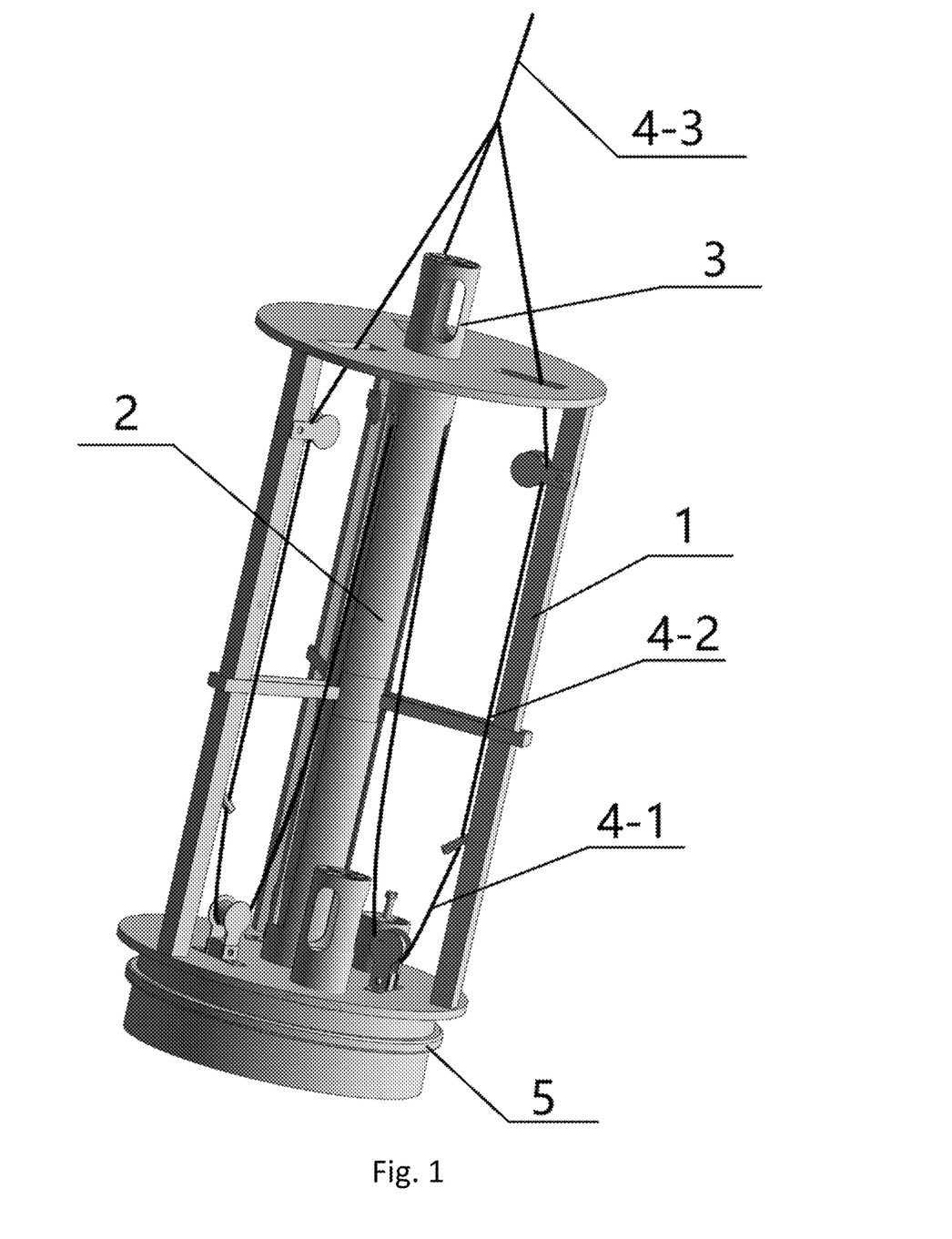
FIG. 1 is a schematic diagram of an integral structure of a water-in state of a self-anchored piling sediment sampler.
Figure 2:
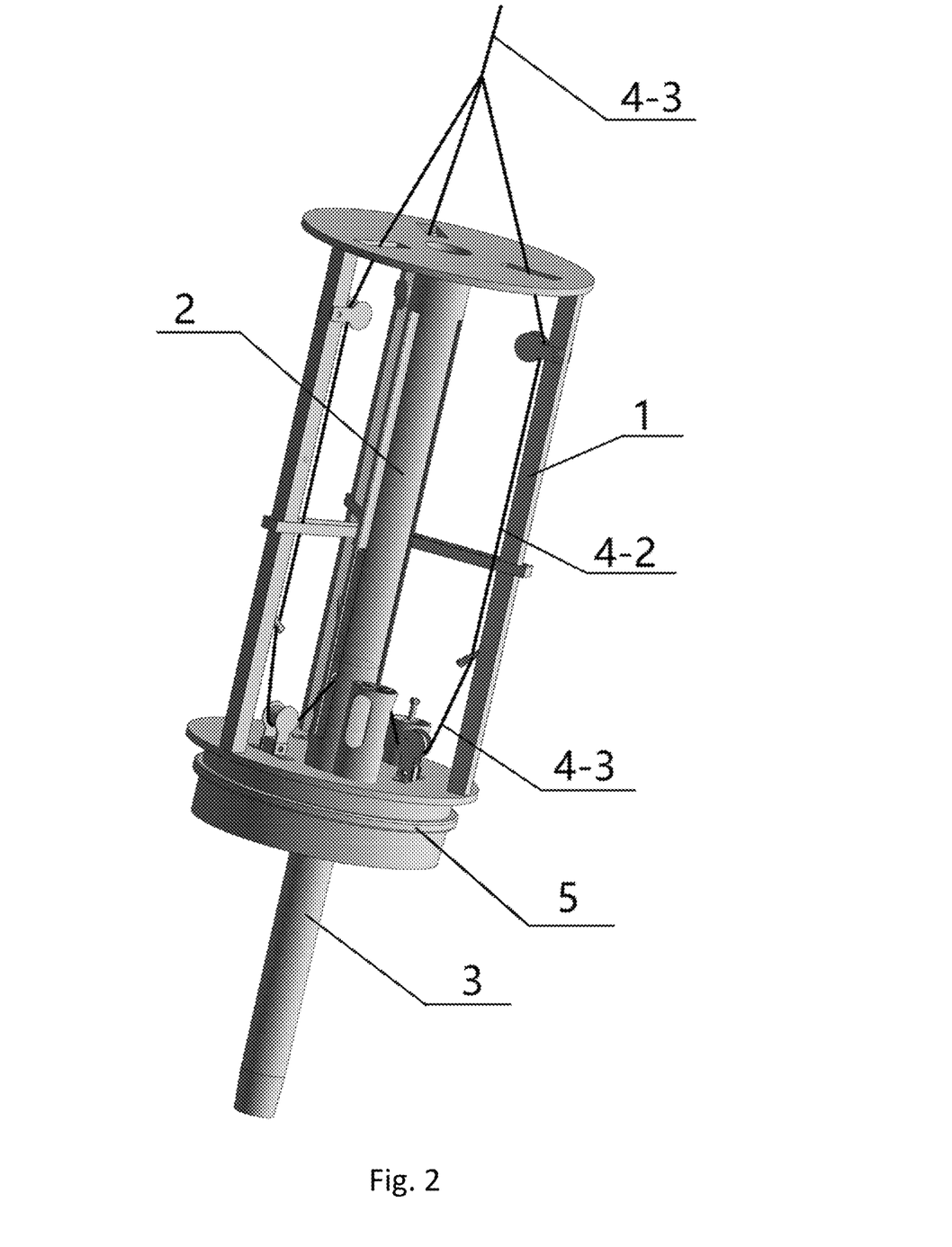
FIG. 2 is a schematic diagram of an integral structure of a water-out state of a self-anchored piling sediment sampler.
Figure 3:
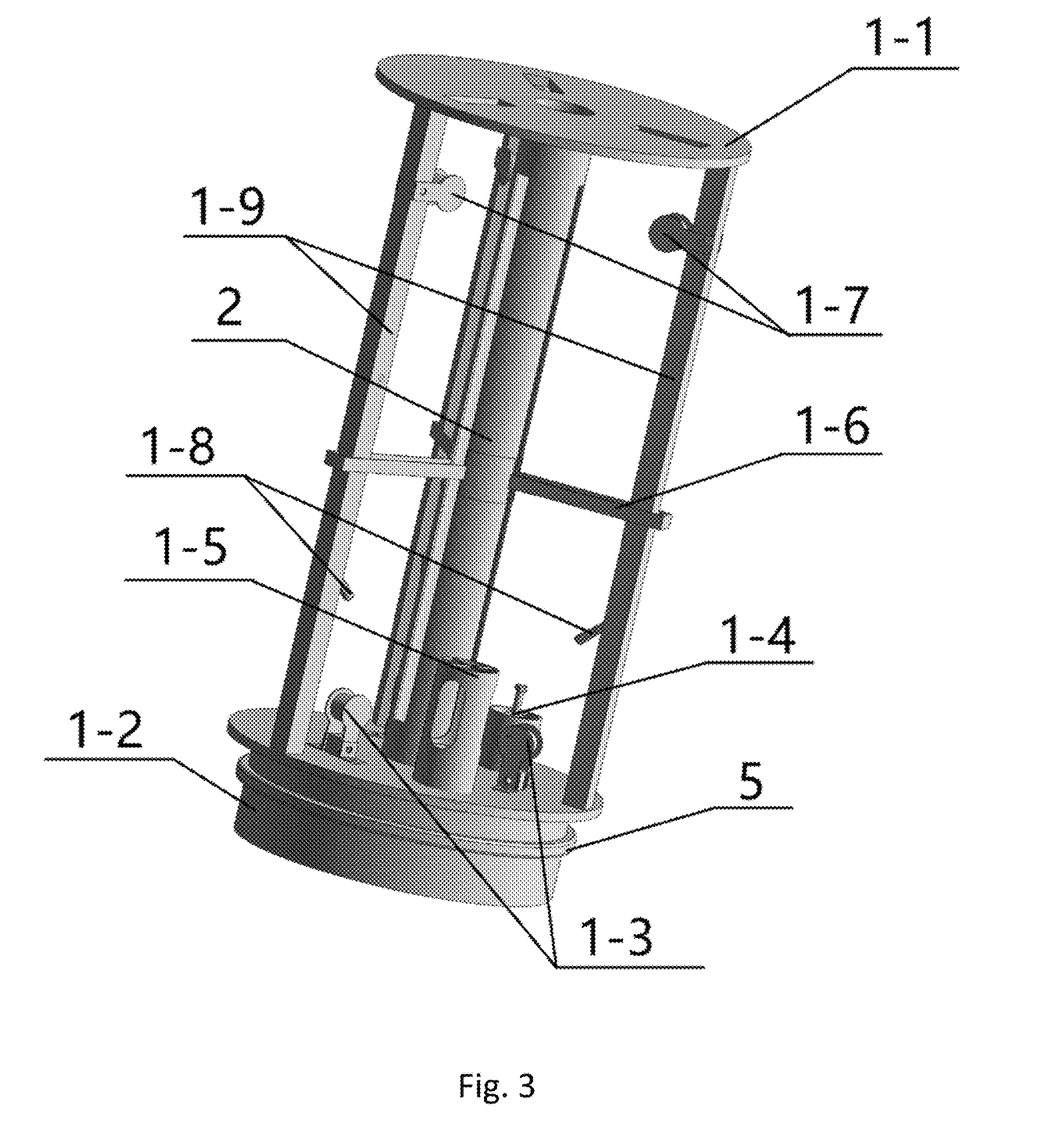
FIG. 3 is a schematic diagram of an anchor rack mechanism, a sampling duct and a counterweight.
Figure 4:
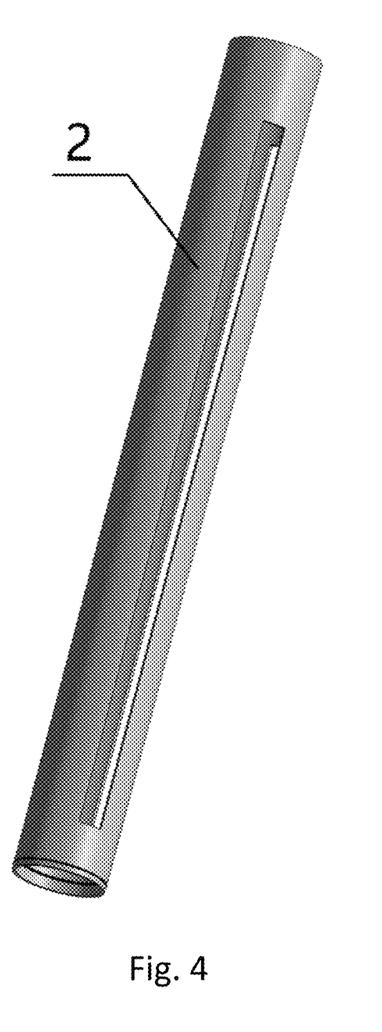
FIG. 4 is a schematic diagram of a sampling duct.
Figure 5A:
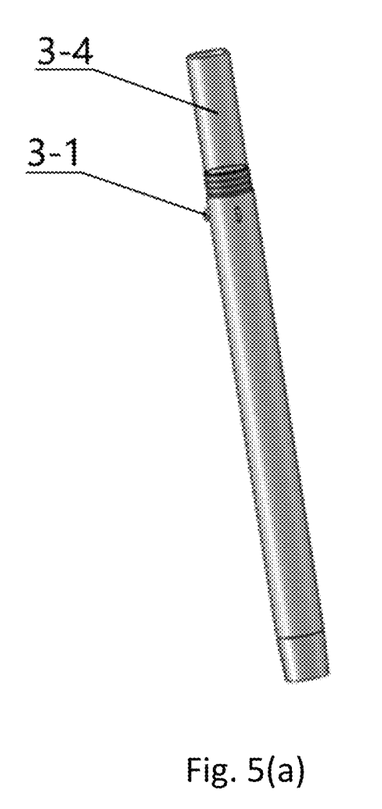
FIG. 5(a) is a schematic diagram of an outer sampling tube and an inner sample tube.
Figure 5B:
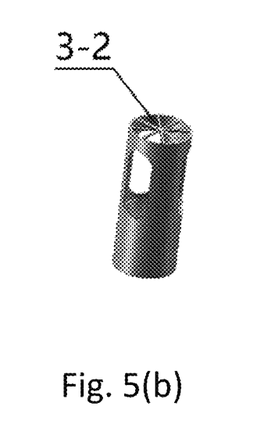
FIG. 5(b) is a schematic diagram of a drain tube.
Figure 5C:
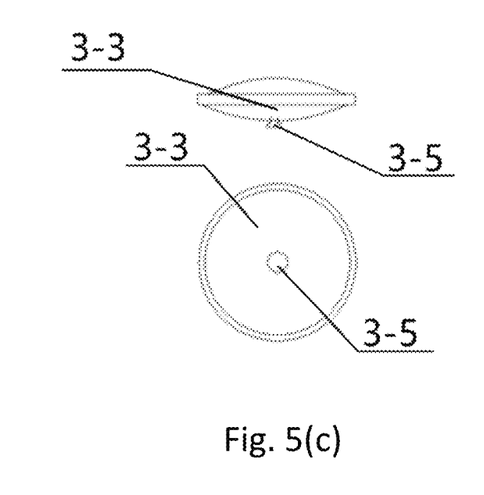
FIG. 5(c) is a schematic diagram of a self-balancing sealing block and a. lower screw
Figure 5D:
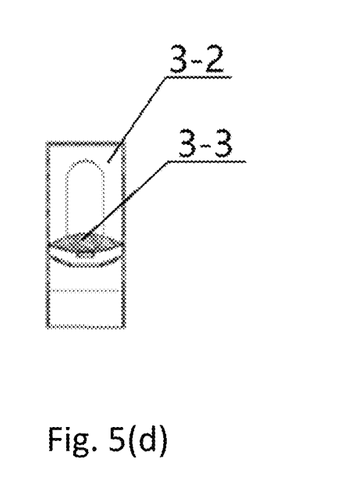
FIG. 5(d) is a schematic diagram of a drain tube and a self-balancing sealing block.
Figure 6:
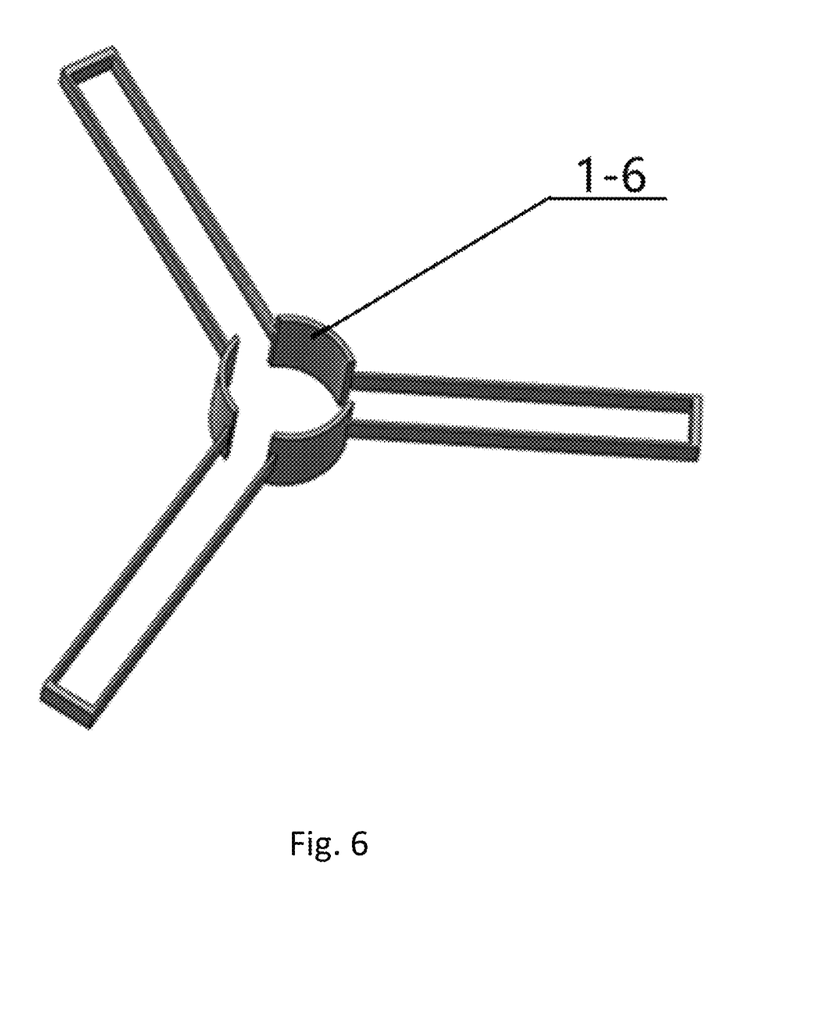
FIG. 6 is a schematic diagram of a fixing bracket.

Specific implementation steps of collection by a self-anchored piling sediment sampler are as follows:

step 1: regulating a bolt 1-4-2 of a water injector 1-4 according to a site sampling water depth and planned sediment collecting depth, and setting the position of the sealing block 1-4-4; sleeving the inner sample tube 3-4 into the outer sampling tube 3-1; then opening the grid above the drain tube 3-2; putting the self-balancing sealing block 3-3 into the drain tube 3-2 and enabling the same to be connected with the outer sampling tube 3-1 to form the sampling tube mechanism 3; sleeving the sampling tube mechanism 3 into a sampling duct 2, so that the sampling tube 3-1 overcomes falling gravity under the friction of the rubber ring under the sampling duct 2;

step 2: enabling the iron chains 4-1 of the first part to penetrate through the lower fixed pulleys 1-3 to the small holes of the outer sampling tube 3-1 from the clamping hooks 1-8; the second part being three short cables 4-2, being connected with the iron chains 4-1 on the clamping hooks 1-8 and penetrating through the upper fixed pulleys 1-7 so that the cables are connected with the iron chains 4-1; the third part being a long cable 4-3 for connecting the three short cables 4-2 of the second part into an integral stress cable through a cable fastener; when the self-anchored piling sediment sampler is lowered, the gravity of the entire collector is born by the third part 4-3 of the cable and the lower fixed pulleys 1-3 and the iron chains 4-1 are unstressed; and then installing the counterweight 5 on the anchor socket 1-2;

step 3: lowering the sampler to the water bottom at uniform speed, wherein at this moment the instrument contacts the sediments and the drainer 1-5 begins to drain water (partially similar to the anchor socket) under a gravity effect; anchoring the tubular supporting plate of the anchor socket 1-2 into the sediments to generate an anchoring force and provide a stable sampling condition together with self gravity (regulated by the counterweight); meanwhile, bearing, by the sediments, the gravity of the instrument; falling, by an iron chain fastener, from the clamping hooks 1-8, wherein at this moment the lower fixed pulleys 1-3 and the iron chains 4-1 begin to bear stress; slightly lifting the cable 4-3; converting the upward pulling force into pressure on the outer sampling tube 3-1 by means of the transformation of the lower fixed pulleys 1-3 and the upper fixed pulleys 1-7, so as to provide a driving force for overcoming sediment resistance, achieve an effect similar to piling by slightly lifting the cable 4-3, and realize collection of layered sediments; during sample collection, jacking the self-balancing sealing block 3-3 under the effect of an impact force of the water and smoothly draining the water by the drain tube 3-2 so as to isolate a pressure difference of an inner tube of the sampling tube 3-4; and enabling the sediments to enter the sampling tube successfully;

step 4: continuously lifting the cable slightly so as to reduce disturbances on the sediment sample so that the outer sampling tube 3-1 continues to sample along the sampling duct 2 under the effect of the pressure until sampling is ended, wherein at this moment, the self-balancing sealing block 3-3 gradually falls under the effect of self gravity and forms an air seal with the bottom of the drain tube 3-2 and no loss of the sample is ensured in cooperation with a daisy sealer under the outer sampling tube 3-1; continuously increasing the suction force exerted on the sealing block of the water injector 1-4 by the sediments during lifting after the sampling is ended, so that the sealing block can be absorbed into the tubular supporting plate of the anchor socket 1-2; ejecting the water from the water injection holes; releasing the suction force of the sediments; and reducing the pulling resistance on the device;

step 5: continuing to lift the cable to lift the device out of the water; removing the counterweight 5; taking out the sampling tube mechanism 3 from bottom to top; unscrewing the drain tube 3-2 to take out the self-balancing sealing block 3-3; unscrewing the daisy sealer under the outer sampling tube 3-1; sealing and storing the inner sample tube 3-4 by using a prepared rubber plug; then ending a single sampling; replacing the inner sampling tube 3-4; and repeating steps 1-5 to continue to sample.

We claim:

1. A self-anchored piling sediment sampler, characterized by comprising an anchor rack mechanism (1), a sampling duct (2), a sampling tube mechanism (3), a cable (4) and a counterweight (5), wherein the sampling tube mechanism (3) is composed of an upper outer sampling tube (3-1), a drain tube (3-2), a self-balancing sealing block (3-3) and an inner sample tube (3-4); the outer sampling tube (3-1) is provided with an external thread on the top, a daisy sealer on the bottom, and three holes are set in an upper part for connection to the iron chains (4-1); a removable grid is distributed on the top of the drain tube (3-2) to prevent the self-balancing sealing block (3-3) from overflowing and a large object from entering the collector; three uniformly distributed drain ports are formed in the middle of the drain tube (3-2); the inner part of the drain tube (3-2) is designed into an ellipsoid to be fitted with the self-balancing sealing block to form a seal; the lower part of the drain tube (3-2) is provided with an internal thread to be connected with an external thread of the outer sampling tube (3-1); the self-balancing sealing block (3-3) is made of light material with a smaller density than water; the weight of a lower screw (3-5) is regulated so that the density of the self-balancing sealing block (3-3) is between $1.1 \times 10^3$ kg/m$^3$ and $1.5 \times 10^3$ kg/m$^3$ and the self-balancing sealing block (3-3) is easy to float under the dynamic effect of the water; the center of gravity of the self-balancing sealing block is at the bottom of a centerline to achieve automatic balance regulation guarantee and drain tube fit, so as to form an airtight effect; the drain tube (3-2) and the self-balancing sealing block (3-3) together form, the drainer as a whole; the inner sample tube (3-4) is an acrylic organic glass tube;

the anchor rack mechanism (1) is composed of a top fixing plate (1-1), a bottom anchor socket (1-2), three uniformly distributed lower fixed pulleys (1-3) on the anchor socket, a water injector (1-4), a drainer (1-5), a fixing bracket (1-6), upper fixed pulleys (1-7), three uniformly distributed clamping hooks (1-8) and three uniformly distributed fixing rods (1-9); a preformed hole for the sampling duct 2 and three uniformly distributed lacing holes are formed in the fixing plate (1-1); the positions of the lacing holes correspond to the lower fixed pulleys (1-3), the upper fixed pulleys (1-7) and the clamping hooks (1-8); three uniformly distributed lower fixed pulleys (1-3), the water injector (1-4) and the drainer (1-5) are arranged on the anchor socket (1-2), and the preformed hole for the sampling duct (2) is also formed in the anchor socket (1-2); a tubular supporting plate is arranged on the bottom; the water injector (1-4) is composed of a shell of the water injector (1-4-1), a bolt (1-4-2) on the top of the shell (1-4-1), a spring (1-4-3) under the bolt (1-4-2) and a sealing block (1-4-4) connected with the spring (1-4-3), three water injection holes are formed in the lower part of the shell (1-4-1), embedded into the annular supporting plate of the anchor socket (1-2); the bolt is configured for regulating the pulling force of the spring; the drainer (1-5) is the same as that of the sampling tube mechanism; the fixing bracket (1-6) is provided with three seams to facilitate the fixing rods (1-9) to pass through; the upper fixed pulleys (1-7) and the clamping hooks (1-8) are installed on the fixing rods (1-9); the fixing bracket (1-6) is configured for stabilizing the self-anchored piling sediment sampler; and members are connected through welding, threads and angle steel to form the anchor rack mechanism (1);

the sampling duct (2) successively penetrates through the preformed hole of the fixing plate (1-1), the preformed holes of the fixing bracket (1-6) and the anchor socket (1-2) so as to be connected with the anchor rack mechanism; the sampling duct (2) is provided with three uniformly distributed guide rails; the guide rails adapt to the preformed holes of the lower fixed pulleys (1-3), the upper fixed pulleys (1-7) and the fixing bracket (1-6); rubber rings are arranged inside and outside the bottom of the sampling duct (2); the outer rubber ring is configured for forming a seal with the anchor socket (1-2), and the inner rubber ring is configured for ensuring the formation of friction with the sampling tube mechanism (3);

the cable (4), which consists of three of three parts, is configured to connect the anchor rack mechanism (1), the sampling duct (2) and the sampling tube mechanism (3); a first part contains three iron chains (4-1) which penetrate through the lower fixed pulleys (1-3) to the holes of the outer sampling tube (3-1) from the clamping hooks (1-8); a second part contains three cables (4-2), wherein the cables (4-2) are connected with the iron chains (4-1) on the clamping hooks (1-8) and penetrate through the upper fixed pulleys (1-7) so that the cables are connected with the iron chains (4-1); a third part is a cable (4-3) for connecting the cables (4-2) into an integral stress cable through a cable fastener;

the counterweight (5) is connected with the anchor socket (1-2).

2. The self-anchored piling sediment sampler according to claim 1, characterized in that the cable (4) is finally fixed to the outer sampling tube (1-3) by the lower fixed pulleys (1-3), the clamping hooks (1-8) and the upper fixed pulleys (1-7) placed on the fixing rods (1-9) so as to realize a conversion of the pulling force into the pressure on the sampling tube and provide a driving force for sampling.

3. The self-anchored piling sediment sampler according to claim 1, characterized in that the drainer (1-5) can drain and seal automatically.

\* \* \* \* \*